Nov. 22, 1938.　　　F. M. YOUNG　　　2,137,556
OIL FILTER
Filed Dec. 23, 1936
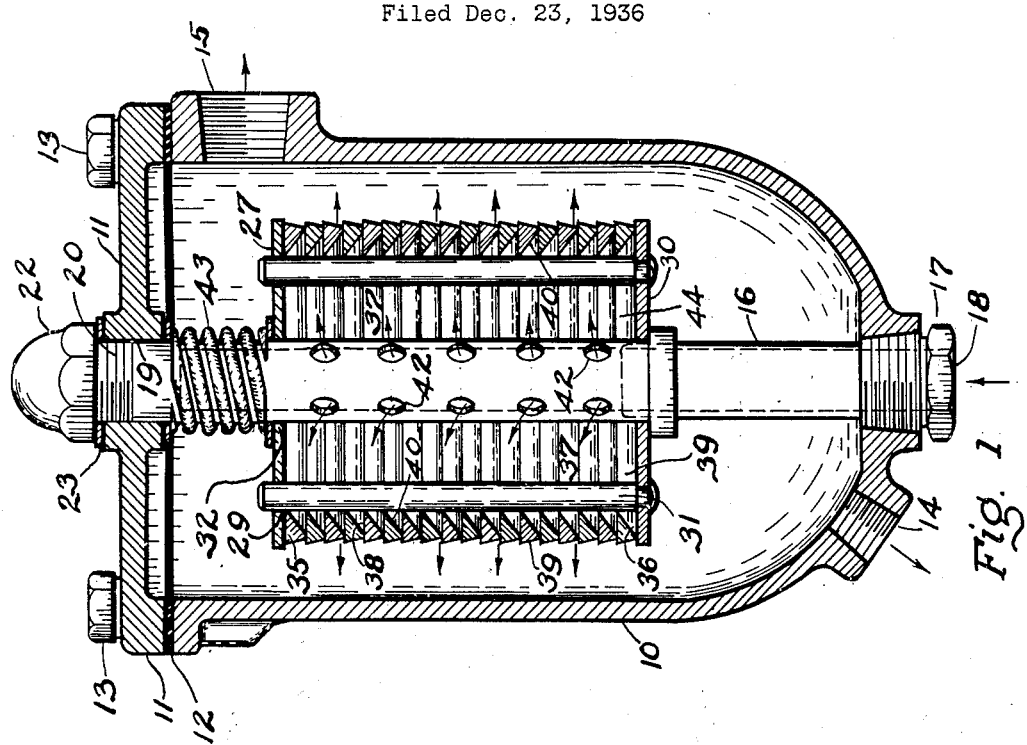
INVENTOR
FRED M. YOUNG
BY ASKnoh
Attorney Patented Nov. 22, 1938

2,137,556

UNITED STATES PATENT OFFICE 2,137,556

OIL FILTER

Fred M. Young, Racine, Wis., assignor of one-half to Sarah R. Lorraine, Glendale, Calif.

Application December 23, 1936, Serial No. 117,298

4 Claims. (Cl. 210—169)

My invention relates to filters used principally for cleaning the circulating oil in internal combustion engines and the like, and has for its object passing all or a portion of the circulating oil through a number of closely fitting metal contact surfaces. Each of the members comprises preferably a knife edge or a very narrow edge in contact with a somewhat wider edge on the adjacent member.

A novel feature of my invention is the forming of the contacting surfaces on opposite sides of rings whereby the rings may be stacked so as to form the outer wall of an inclosure into which the oil to be cleaned or filtered is fed.

A novel feature of the present invention is the outer and inner chambers, the inner chamber being formed by two spaced end plates and filtering rings therebetween, including the means for yieldingly holding this assembly together, whereby the oil pressure will in a measure counteract the pressure on the rings but the oil will be forced to escape between smooth contact rings which are under pressure.

The principal object of the invention is to eliminate the use of fibrous filtering material, which material is objectionable because it is not uniform in mesh and texture, and particles of which sluff off and then pass into the circulating tubes and bearings, which is extremely undesirable for obvious reasons.

A further object of my invention is to provide a filter which is very simple, easily taken apart and cleaned and reassembled, and whereby all of the foreign matter separated from the oil, is permitted to settle in the bottom of the housing or in the bottom of the chamber formed by the rings.

A further object of my invention is to provide means whereby the tension between the rings may be changed by changing or adjusting the spring, to thereby accommodate the filter to various requirements.

Circular rings as filtering means are particularly suited to the invention because the contacting surfaces may be easily and accurately machined, and when they are bound together, the combined length of the filtering surface may be many feet and still occupy a very small area.

A novel feature of my invention is that the filtering means is practically indestructible and may be easily removed, cleaned and replaced without danger of injury or misplacement.

To these and other useful ends the present invention consists of parts and combinations thereof or their equivalents as hereinafter set forth and claimed and shown in the accompanying drawing in which:

Fig. 1 is a transverse vertical section of the preferred form of my invention, taken on line 1—1 of Figure 2.

Fig. 2 is a bottom view of the device, some of the parts being shown by dotted lines.

Fig. 3 is a sectional view of a modification of the filter rings.

Fig. 4 is an enlarged section of a fraction of two rings as illustrated in Figure 1, but positioned with the narrow edges up.

As thus illustrated numeral 10 designates the chamber or outer housing of the filter, the top plate 11 being removable for insertion of the filtering unit and having suitable surfaces whereby a gasket 12 may be used for sealing the joint between these members by means of bolts 13.

I provide a drain opening 14 in the base of chamber 10 and an outlet opening 15 in the top of this chamber. I provide a tube 16 which is secured at its bottom to a screw threaded member 17, this member being screw threaded into chamber 10 as indicated. Member 17 is provided with a screw threaded inlet opening as at 18. Plate 11 is provided with an orifice 19 through which tube 16 extends, the end of the tube being screw threaded as at 20, this end protruding through orifice 19 far enough to receive an acorn nut 22 under which a gasket 23 is positioned; thus clearly when tube 16 is in the position shown, nut 22 may be tightened and an oil tight chamber provided.

A flanged ring 30 is secured to tube 16. This ring is provided with spaced rods 31 (see dotted lines in Figure 2). A plate 27 having an orifice 32 which snugly embraces tube 16 is provided. Plate 27 is also provided with orifices 29 which snugly embrace rods 31; thus plate 27 may be moved longitudinally on tube 16 and rods 31.

The inner peripheral surfaces of plates 27 and 30 are ground or machined true as at 35 and 36. The space between 35 and 36 is filled by a large number of filter rings 37 each having a wide surface 38 which is machined or ground true. These rings have inner and outer surfaces 39 and 40 which converge forming an apex as at 41. This surface 41 is preferably ground or machined flat (as indicated in Figure 4), forming a very narrow surface or it may be left knife edged.

A novel feature of applicant's device is the adaptability of his filter rings. They are preferably made of metal and therefore may be cheaply and accurately formed. Variously shaped rings may be manufactured and assembled in the outer housing with a view to meeting the requirements of the installations to which they are to be applied, each unit bearing a mark indicating the type or shape of ring therein.

Between plates 27 and 30, a number of spaced orifices 42 are provided in tube 16.

I provide a spring 43 which acts to press the rings together thus forming a spring sealed inner chamber 44 into which the oil will flow from inlet 18, spring 43 holding the rings snugly together, the pressure of the oil, however, being sufficient to cause it to pass out of this chamber in a very thin film between the rings and into the outer chamber whence it may return to the engine from outlet 15.

Referring to Figure 3 it will be noted that I provide disks 45 which are pressed from flat stock and finished so as to provide contact points similar to surfaces 38 and 41 of Figure 4.

These disks, as will be noted, have openings in their centers which loosely embrace tube 16 and thus they will be self centering. I provide a number of large openings 50 for free passage of oil between the disks.

In Figure 4 I illustrate the rings as reversed from that shown in Figure 1, that is, the narrow edges point upward, thus to prevent the accumulation of foreign matter around the surfaces.

Thus it will be seen that I have provided a simple, neat and efficient oil filter which is practically indestructible and easily cleaned. It will be understood that many minor detail changes may be made without departing from the spirit and scope of the invention as recited in the appended claims.

I claim:

1. A filter of the class described, comprising an outer chamber having an outlet, an inner chamber having an inlet tube from the exterior of said first chamber, said inner chamber comprising two spaced members and a multiplicity of metal rings assembled one over the other and positioned between said end plates to thereby form the wall of said inner chamber, said tube extending through said inner chamber and having an opening into said inner chamber, one of said inner chamber members being slidably mounted on said tube, a spring on said tube being adapted to press on said slidably mounted member and thereby yieldingly bind said rings together, said rings being faced true on their contacting surfaces, a number of spaced rods supported by said end members and positioned to contact the inner edges of said rings thereby to hold said rings in alignment.

2. A filter of the class described, comprising an outer chamber having an outlet and an inner chamber having a tube which extends through the wall of said outer chamber, said inner chamber formed by two end members and a multiplicity of rings stacked one over the other, cooperating with said end members to thereby form said inner chamber, said rings having narrow smooth edges on one side, and a wide smooth surface on the other side and stacked whereby the narrow edges contact the wide edges on the adjacent rings, a spring on said tube being positioned to press on one of said end members to thereby yieldingly hold said rings together, an outlet in said outer chamber and an inlet to said inner chamber in said tube, whereby oil entering said tube will pass from said inner chamber between said rings to said outer chamber.

3. A filter of the class described, comprising an outer chamber and an inner chamber, said inner chamber formed by two end plates and a multiplicity of rings stacked one on the other and positioned between said end plates to thereby form the wall of said inner chamber, a tube having an inlet extending through each said chambers, one of said end plates being rigidly secured to said tube and the other end plate being slidably mounted thereon, a spring on said tube adapted to press on said slidably mounted plate to thereby yieldingly hold said rings together, an opening in said tube to said inner chamber, an outlet in said outer chamber whereby oil may be forced between said rings from said tube inlet to said chamber outlet.

4. A filter of the class described, comprising in combination, an outer chamber and an inner chamber, said inner chamber formed by means of end members and a multiplicity of individual rings stacked one over the other and positioned between said end members to thereby form the wall of said inner chamber, means adapted to individually hold said rings in alignment, an inlet connection from the exterior of said outer chamber to the interior of said inner chamber and means whereby said rings are yieldingly held together under pressure, an outlet opening in said outer chamber whereby liquid entering said inner chamber through said inlet may pass between said rings to said outer chamber and escape through said outlet, said rings comprising narrow and wide smooth edge surfaces and being stacked with the narrow surfaces in contact with the wide surfaces of the adjacent ring.

FRED M. YOUNG.